_United States Patent Office_

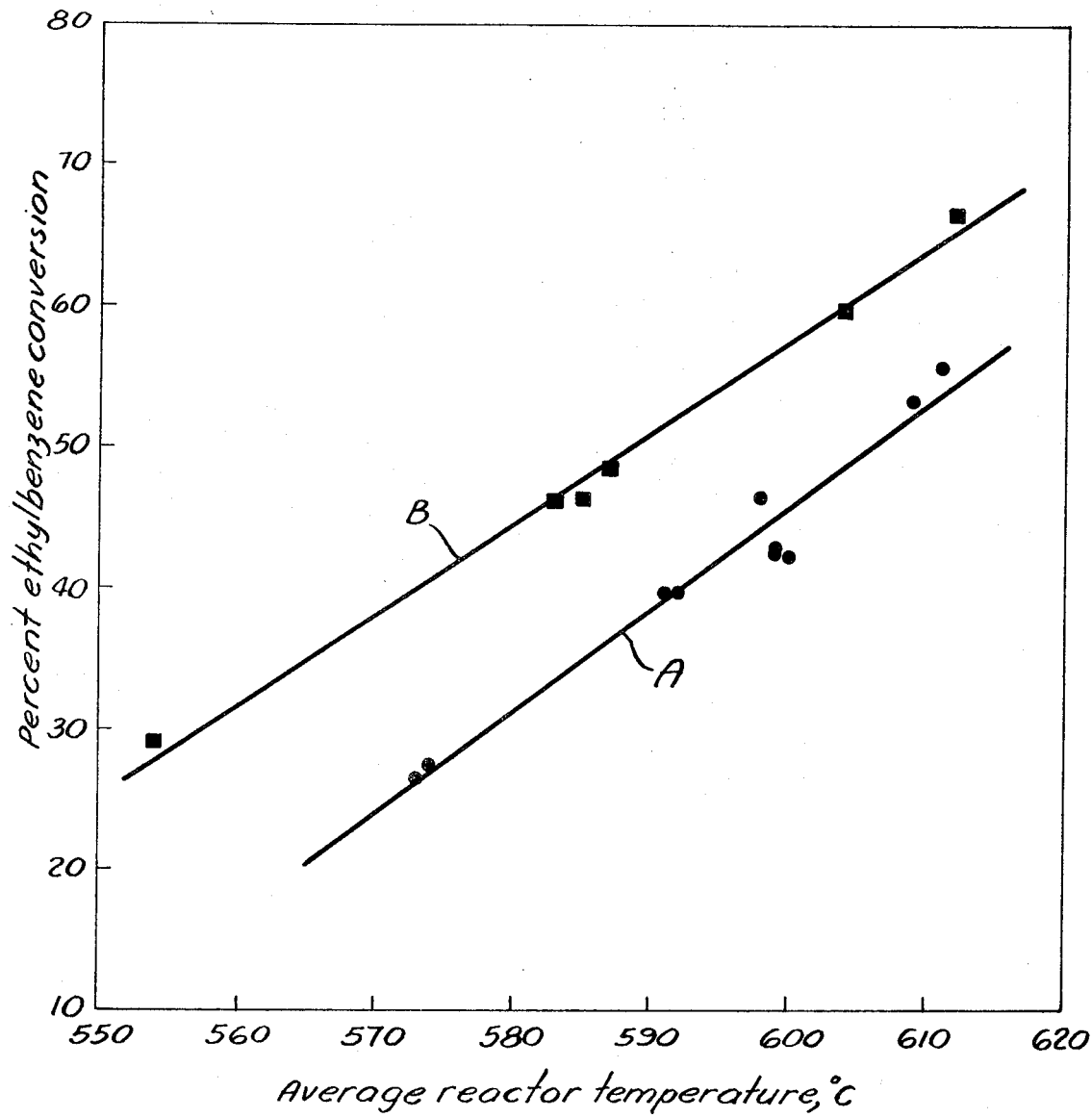

3,654,181
Patented Apr. 4, 1972

3,654,181
METHOD FOR ACTIVATION OF IRON OXIDE CONTAINING DEHYDROGENATION CATALYSTS
Samuel S. Sutherland, Jr., Freeport, and George W. Dailey, Angleton, Tex., assignors to The Dow Chemical Company, Midland, Mich.
Filed Oct. 21, 1970, Ser. No. 82,576
Int. Cl. B01j *11/02, 11/30*
U.S. Cl. 252—414
2 Claims

ABSTRACT OF THE DISCLOSURE

A method of activation of the self-regenerating iron oxide catalysts employed to dehydrogenate ethylbenzene to styrene by operating the reactor containing such catalyst so as to produce abnormally high conversions of ethylbenzene for a period of at least two days. Thereafter, the activity of the catalyst is improved at the usual levels of conversion.

---

This invention relates to a process for the activation of dehydrogenation catalysts and more particularly relates to a method for increasing the activity of the iron oxide type catalysts employed in the dehydrogenation of ethyl benzene to styrene.

In the past, it has been accepted that ethyl benzene dehydrogenation catalysts should be operated under conditions as mild as possible and manufacturers of such catalysts generally recommend that the catalyst be put into use by approaching the design conditions of temperature, steam/ethyl benzene ratio and space velocity from the direction of conditions less severe than design conditions and then maintaining the design conditions for the particular catalyst during routine operation.

It is an object of this invention to provide a method for activating a dehydrogenation catalyst. A further object is to provide a novel method for treating an ethyl benzene dehydrogenation catalyst, while it is being used for its designated purpose, to increase its activity. These and other objects and advantages of the present process will become apparent from a reading of the following detailed description.

It has now been discovered that the activity of dehydrogenation catalysts, particularly the iron oxide-based ethyl benzene dehydrogenation catalysts, is significantly improved by operating the reactor containing such catalyst in such a manner as to produce an ethyl benzene conversion significantly above the conversion normally employed or called for by the design conditions and operating the reactor in this manner for at least 48 hours. Upon return to operation at design conditions, the activity of the catalyst will have significantly increased, i.e. a higher conversion is achieved when the reactor is operated at its normal operating temperature or a lower temperature may be employed to achieve the previous level of conversion.

The catalysts to which this invention is particularly useful are those catalysts commonly referred to as the "self-regenerating" ion oxide catalysts used principally to dehydrogenate ethyl benzene to styrene. Such catalysts all contain a major proportion of iron oxide and a minor proportion of an alkali metal oxide such as $K_2O$. In addition, such catalysts may contain additions such as salts or oxides of chromium, manganese, bismuth, tungsten, molybdenum or vanadium and/or modifiers such as carbon black, graphite or methyl cellulose. Such catalysts are usually characterized by having a relatively low surface area, by being physically strong and by retaining their activity for long periods of time.

The activation technique of this invention is not applicable to new, unused catalysts but may be used to activate catalysts which have been in operation for periods of time of as little as a week. For best results, however, the process is applied to catalysts which have been in normal use for at least two weeks.

In order to activate such a catalyst according to the process of this invention, the conversion of ethyl benzene in the reactor containing such catalyst is increased to a range of from about 65 to about 88%, preferably from about 70 to about 85%. This is normally accomplished by raising the temperature of the reactor, or increasing the residence time of the ethyl benzene therein or both. The reactor conditions are maintained to provide this increased conversion for a time period of from about 2 days to about 7 days. Longer periods of operation at increased conversion are not detrimental to the catalyst but no further activation is achieved.

In general, the shorter activation periods are preferred since, during the periods of high conversion, the selectivity of the catalyst (i.e. yield to styrene) is significantly decreased. At the end of the activation period, the reactor conditions are adjusted to provide the usual conversion level (e.g. 40–60%) for the particular catalyst. This adjustment may be accomplished in a single step or the conversion may be slowly lowered to the desired level over the period of several days.

It is known that after extended periods of use an iron oxide dehydrogenation catalyst becomes less active. The same characteristic is present when such catalysts have been activated by the process of this invention and it is usually necessary, therefore, to activate the catalyst more than once during its useful life.

The activity of a dehydrogenation catalyst is shown by the temperature at which such catalyst will produce a given conversion of ethyl benzene to styrene at otherwise identical reaction conditions. Therefore the increased activity provided to dehydrogenation catalysts by the process of this invention enables such catalysts to achieve a particular level of conversion at a lower temperature than catalysts not so activated where the other reaction conditions are the same.

As used herein the terms "yield" and "styrene selectivity" have the same meaning and are defined by the following:

$$\frac{\text{moles of styrene produced} \times 100}{\text{moles ethyl benzene converted}} = \text{yield or styrene selectivity}$$

EXAMPLE 1

A flow of 0.7 gm. mole/hr. of 99.5% purity ethylbenzene and 8.3 gm. mole/hr. of water was vaporized, preheated to about 600° C., and passed over a bed of dehydrogenation catalyst one inch in diameter and seven inches thick, containing 110 grams of catalyst. All of the heat for vaporization, preheating and reaction was supplied by external heaters. A commercially available catalyst was employed which was composed mainly of $Fe_2O_3$ and additionally contained $K_2O$, cement, oxides of chromium and vanadium, and had a surface area of 2.64 sq. m./gm. The products from the reactor were passed through a refrigerated condenser, the condensed hydrocarbons and water were collected and analyzed and the non-condensed gases were measured and vented.

Prior to activation of the catalyst according to the process of this invention, the reactor temperature was varied between 593° C. and 611° C. to obtain conversion of ethylbenzene which ranged from 26.5% to 55.8% and, as shown by line A of the figure, the ethylbenzene conversion was plotted versus the reactor temperature. This line represents the activity of the catalyst prior to activation. The period of operation prior to activation as shown by line A was 8 days.

To activate the catalyst, the reactor temperature was increased to the range of 632–662° C., averaging 648° C. The ethylbenzene converted during the activation period of 7 days ranged from 69.5–88.2%, averaging 81.2%.

After activation, the reactor temperature was lowered to obtain conversions of ethylbenzene ranging from 29.1 to 66.6%. The conversion versus reactor temperature was then plotted to produce line B of the figure. This line represents the activity of the catalyst after activation and that, at any temperature within the range, the catalyst is significantly more active than it had been prior to the activation step.

The following table provides the data from which the figure was constructed, the reactor operation conditions during activation and additionally shows the percent styrene selectivity in each of the runs:

| | Average reactor temperature, ° C. | Percent E.B. conversion | Percent styrene selectivity |
|---|---|---|---|
| | | Reactor operation prior to activation | |
| Run No.: | | | |
| 1 | 599 | 42.6 | 96.4 |
| 2 | 600 | 42.2 | 96.3 |
| 3 | 599 | 42.8 | 96.4 |
| 4 | 598 | 46.7 | 96.1 |
| 5 | 574 | 27.4 | 96.0 |
| 6 | 573 | 26.5 | 97.1 |
| 7 | 592 | 39.9 | 96.4 |
| 8 | 591 | 39.9 | 96.4 |
| 9 | 609 | 53.3 | 95.5 |
| 10 | 611 | 55.8 | 95.2 |
| | | Reactor operation during activation | |
| 11 | 633 | 69.5 | 94.3 |
| 12 | 632 | 73.7 | 93.0 |
| 13 | 651 | 82.6 | 91.0 |
| 14 | 648 | 83.0 | 90.9 |
| 15 | 647 | 83.8 | 90.8 |
| 16 | 661 | 87.7 | 89.4 |
| 17 | 662 | 88.2 | 88.8 |
| | | Reactor operation following activation | |
| 18 | 612 | 66.6 | 93.8 |
| 19 | 585 | 46.3 | 96.2 |
| 20 | 554 | 29.1 | 97.3 |
| 21 | 587 | 48.5 | 95.9 |
| 22 | 583 | 46.1 | 95.9 |
| 23 | 604 | 59.9 | 95.0 |

EXAMPLE 2

A flow of ethylbenzene and steam, in the ratio of 2.1 pounds of steam per pound of ethylbenzene, was vaporized and passed to an adiabatic reactor at 681° C. The reactor contained 50 cubic feet of a commercially available dehydrogenation catalyst composed largely of $Fe_2O_3$ but likewise containing oxides of potassium, chromium and vanadium and had a surface area of 2.87 sq. m./gm. The products from the reactor passed through a heat exchange and condensing system where the condensed water and hydrocarbons were separated from uncondensed gases. The liquid phases were passed to a water-hydrocarbon separator, from which the hydrocarbon phase was forwarded to conventional styrene purification equipment. Prior to activation, the average reactor temperature was 641° C. which produced an average of 50.0% ethylbenzene conversion and an average styrene selectivity of 91.9%.

After operating in this manner for 19 days, the ratio of steam to ethylbenzene fed to the reactor was increased to 3.49 and the average reactor temperature was increased to 690° C. to produce an ethylbenzene conversion of 80.6% and a yield of 81.6%. This level of conversion was maintained for 2 days.

After the above activation period, the ratio of steam to ethylbenzene fed to the reactor was decreased to 2.83 and the average reactor temperature was decreased to 666° C. to produce an ethylbenzene conversion of 72.3% and a yield of 85.1%. This level of conversion was maintained for 2 days.

Immediately following the above period, the steam to ethylbenzene ratio was decreased to 2.47 and the average reactor temperature decreased to 651° C. to produce an ethylbenzene conversion of 65.4% and a yield of 87.2%. This level of conversion was maintained for 16 days.

The ratio of steam to ethylbenzene was then reduced to 2.22 and the reactor temperature was reduced until a conversion of 48.5% was obtained. The average reactor temperature was now only 629° C. compared to 641° C. prior to activation and no reduction in yield to styrene was obtained. After 3 weeks of operating in this manner there was no detectable decrease in activity of the catalyst.

The following table provides the data for each run within the periods discussed above.

| | Temperature, ° C. | S/O ratio | Percent E.B. conversion | Percent styrene selectivity |
|---|---|---|---|---|
| Run No.: | | | | |
| 1 | 622 | 2.27 | 60.4 | 90.1 |
| 2 | 642 | 2.12 | 52.0 | 91.3 |
| 3 | 644 | 2.14 | 49.2 | 92.4 |
| 4 | 645 | 1.96 | 4.68 | 92.2 |
| 5 | 647 | 2.15 | 45.6 | 92.9 |
| 6 | 646 | 2.09 | 45.8 | 92.5 |
| 7 | 700 | 3.52 | 83.1 | 78.1 |
| 8 | 680 | 3.45 | 78.1 | 85.0 |
| 9 | 672 | 2.73 | 71.1 | 86.4 |
| 10 | 660 | 2.93 | 73.4 | 83.7 |
| 11 | 649 | 2.55 | 67.8 | 86.8 |
| 12 | 652 | 2.56 | 68.5 | 86.2 |
| 13 | 650 | 2.54 | 66.3 | 87.2 |
| 14 | 648 | 2.30 | 65.2 | 87.3 |
| 15 | 649 | 2.60 | 65.1 | 87.9 |
| 16 | 653 | 2.49 | 64.9 | 87.5 |
| 17 | 650 | 2.28 | 62.7 | 87.1 |
| 18 | 657 | 2.45 | 62.6 | 87.9 |
| 19 | 630 | 2.27 | 48.0 | 92.5 |
| 20 | 629 | 2.16 | 49.0 | 91.5 |

We claim:

1. A process for increasing the activity of a self-regenerating iron oxide-containing catalyst for the dehydrogenation of ethyl benzene to styrene which comprises (1) passing ethyl benzene and steam over a previously used self-regenerating iron oxide-containing dehydrogenation catalyst at reaction conditions, including increasing the reaction temperature to produce a conversion of ethyl benzene of between about 65 and about 88% for a period of at least 2 days and (2) modifying the reaction conditions, including lowering the reaction temperature to reduce the conversion of ethyl benzene to the usual level of between about 40 and about 60%.

2. The process of claim 1 wherein the conversion in step (1) is raised to between about 70 and about 85%.

References Cited

UNITED STATES PATENTS

| 2,405,436 | 8/1946 | Laughlin | 260—669 R |
| 3,306,942 | 2/1967 | Lee | 260—669 R |
| 3,387,053 | 6/1968 | Lee | 260—669 R |
| 3,435,086 | 3/1969 | Soderquist et al. | 260—669 R |
| 3,542,883 | 11/1970 | Nenitescu et al. | 252—414 |

DANIEL E. WYMAN, Primary Examiner

P. E. KONOPKA, Assistant Examiner

U.S. Cl. X.R.

252—411 R, 420, 474; 260—669 R

PO-1050
(5/69)

UNITED STATES PATENT OFFICE
CERTIFICATE OF CORRECTION

Patent No. 3,654,181             Dated  4 April 1972

Inventor(s)   Samuel S. Sutherland and George W. Dailey

It is certified that error appears in the above-identified patent and that said Letters Patent are hereby corrected as shown below:

Column 1, line 62, delete "ion" and insert --iron--.

Column 4, in the Table, the 4th line under the column headed "Percent E.B. Conversion", change "4.68" to --46.8--.

Signed and sealed this 25th day of July 1972.

(SEAL)
Attest:

EDWARD M. FLETCHER, JR.            ROBERT GOTTSCHALK
Attesting Officer                  Commissioner of Patents